US009031936B2

(12) United States Patent
Soshin

(10) Patent No.: US 9,031,936 B2
(45) Date of Patent: May 12, 2015

(54) RANKING SEARCH RESULTS USING AN ENTITY NETWORK

(75) Inventor: Alexey Soshin, Ramat Gan (IL)

(73) Assignee: SAP Portals Israel Ltd, Ra'anana 43657 (IL)

( * ) Notice: Subject to any disclaimer, the term of this patent is extended or adjusted under 35 U.S.C. 154(b) by 138 days.

(21) Appl. No.: 13/535,619

(22) Filed: Jun. 28, 2012

(65) Prior Publication Data

US 2014/0006393 A1 Jan. 2, 2014

(51) Int. Cl.
*G06F 17/30* (2006.01)
(52) U.S. Cl.
CPC ...................................... *G06F 17/30* (2013.01)
(58) Field of Classification Search
CPC ..................... G06F 17/30598; G06F 17/30766
See application file for complete search history.

(56) References Cited

U.S. PATENT DOCUMENTS

| | | | | |
|---|---|---|---|---|
| 2005/0201290 | A1* | 9/2005 | Vasudev et al. | 370/238 |
| 2010/0161369 | A1* | 6/2010 | Farrell et al. | 705/8 |
| 2011/0138123 | A1* | 6/2011 | Gurajada et al. | 711/118 |
| 2012/0102027 | A1* | 4/2012 | Zhu et al. | 707/723 |
| 2013/0138662 | A1* | 5/2013 | He et al. | 707/748 |
| 2013/0254213 | A1* | 9/2013 | Cheng et al. | 707/748 |

OTHER PUBLICATIONS

'Apache Lucene Core' [online]. Lucene, 2011, [retrieved on Jun. 29, 2012]. Retrieved from the Internet: <URL: http://lucene.apache.org/core/>, 2 pages.
'Query Parser Syntax' [online]. Apache Lucene, 2006, [retrieved on Jun. 29, 2012]. Retrieved from the Internet: <URL: http://lucene.apache.org/core/3_6_0/queryparsersyntax.html>, 6 pages.
'Decorator pattern' [online]. Wikipedia, 2011, [retrieved on Jun. 29, 2012]. Retrieved from the Internet: <URL: http://en.wikipedia.org/w/index.php?title=Decorator_pattern&oldid=435711881>, 7 pages.
'Lucene' [online]. Wikipedia, 2011, [retrieved on Jun. 29, 2012]. Retrieved from the Internet: <URL: http://en.wikipedia.org/w/index.php?title=Lucene&oldid=434848053>, 3 pages.
'Six degrees of separation' [online]. Wikipedia, 2011, [retrieved on Jun. 29, 2012]. Retrieved from the Internet: <URL: http://en.wikipedia.org/w/index.php?title=Six_degrees_of_separation&oldid=435719468>, 9 pages.
'Social network analysis' [online]. Wikipedia, 2011, [retrieved on Jun. 29, 2012]. Retrieved from the Internet: <URL: http://en.wikipedia.org/w/index.php?title=Social_network_analysis&oldid=436406384>, 12 pages.

(Continued)

*Primary Examiner* — Anh Tai Tran
(74) *Attorney, Agent, or Firm* — Fish & Richardson P.C.

(57) ABSTRACT

A computer-implemented method for ranking search results using an entity network includes: receiving an entity search query submitted for performance on an entity network, the entity search query including at least one term and indicating a query submitter, the entity network comprising entities associated with each other by relations; identifying, based on the received search query and using one or more processors, all entities in the entity network that are responsive to the at least one term; ranking the identified entities, based on relevance with regard to the query submitter and using one or more processors, the ranking performed using proximity in the entity network; and presenting the identified entities in response to the entity search query, the entities presented in an order corresponding to the ranking.

15 Claims, 4 Drawing Sheets

(56) References Cited

OTHER PUBLICATIONS

'Web search engine' [online]. Wikipedia, 2011, [retrieved on Jun. 29, 2012]. Retrieved from the Internet: <URL: http://en.wikipedia.org/w/index.php?title=Web_search_engine&oldid=436860476> 7 pages.

'H4T Hana for Triples' [online]. SAP AG, 2011, [retrieved on Jun. 29, 2012]. Retrieved from the Internet: <URL: https://cw.sdn.sap.com/cw/ideas/4721>, 3 pages.

* cited by examiner

RANKING SEARCH RESULTS USING AN ENTITY NETWORK

BACKGROUND

This document relates to ranking search results.

Many organizations maintain electronic records of employees, customers, vendors and/or other business partners, to name just a few examples. Sometimes such records can indicate a relation between two or more such entities. For example, for an employee who is a manager the record can indicate the name of any employee who reports to the manager. Based on such information the employee directory can be considered a social network, in that the supervisory role of the manager creates connections with the supervised employees by interactions (e.g., in person, by email, instant message or phone). Other entity networks are sometimes also considered social networks.

SUMMARY

In a first aspect, a computer-implemented method for ranking search results using an entity network includes: receiving an entity search query submitted for performance on an entity network, the entity search query including at least one term and indicating a query submitter, the entity network comprising entities associated with each other by relations; identifying, based on the received search query and using one or more processors, all entities in the entity network that are responsive to the at least one term; ranking the identified entities, based on relevance with regard to the query submitter and using one or more processors, the ranking performed using proximity in the entity network; and presenting the identified entities in response to the entity search query, the entities presented in an order corresponding to the ranking.

In a second aspect, a computer program product is tangibly embodied in a computer-readable storage medium and includes instructions that when executed by a processor perform a method for ranking search results using an entity network. The method includes: receiving an entity search query submitted for performance on an entity network, the entity search query including at least one term and indicating a query submitter, the entity network comprising entities associated with each other by relations; identifying, based on the received search query and using one or more processors, all entities in the entity network that are responsive to the at least one term; ranking the identified entities, based on relevance with regard to the query submitter and using one or more processors, the ranking performed using proximity in the entity network; and presenting the identified entities in response to the entity search query, the entities presented in an order corresponding to the ranking.

Implementations can include any or all of the following features. The method further includes: detecting addition of a new entity to the entity network; in response to the addition, determining relevance scores for the new entity with regard to all current entities in the entity network; and storing the determined relevance scores. Determining the relevance scores includes: determining, using the relations in the entity network and for each of the current entities in the entity network, a number of steps between the new entity and the current entity; and for each of the current entities, dividing a constant by the determined number of steps for the current entity; for each of the current entities, assigning a quotient of the division as the relevance score for the new entity with regard to the current entity. The method further includes taking into account in the ranking also at least one other relevance between entities in the entity network and the query submitter. The method further includes: detecting that at least a first entity of the entity network engages in electronic communication with at least a second entity of the entity network; and updating an electronic-message relevance score regarding the first and second entities based on the detection; and using the electronic-message relevance score in taking into account the other ranking. The method further includes: weighting the relevance and the other relevance before the ranking, wherein the ranking takes into account the weighting. The method further includes: receiving an input from the query submitter, the input selecting the relevance and the other relevance, and wherein the relevance and the other relevance are taken into account in the ranking in response to receiving the input.

In a third aspect, a system includes one or more processors; and a computer program product comprising instructions that when executed perform a method for ranking search results using an entity network. The method includes: receiving an entity search query submitted for performance on an entity network, the entity search query including at least one term and indicating a query submitter, the entity network comprising entities associated with each other by relations; identifying, based on the received search query and using one or more processors, all entities in the entity network that are responsive to the at least one term; ranking the identified entities, based on relevance with regard to the query submitter and using one or more processors, the ranking performed using proximity in the entity network; and presenting the identified entities in response to the entity search query, the entities presented in an order corresponding to the ranking.

Implementations can provide any or all of the following advantages. Searching of an employee directory can be improved. Employee records can be embellished with additional information relevant for searching. A more relevant data searching functionality can be implemented without copying data to external indexes.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes example of systems and techniques that can take into account a social network (e.g., a network of fellow employees) when providing results to a search query. For example, when searching for an individual by name in an employee directory, the obtained results can be ranked in order of proximity to the person who submitted the query.

Figure 1:
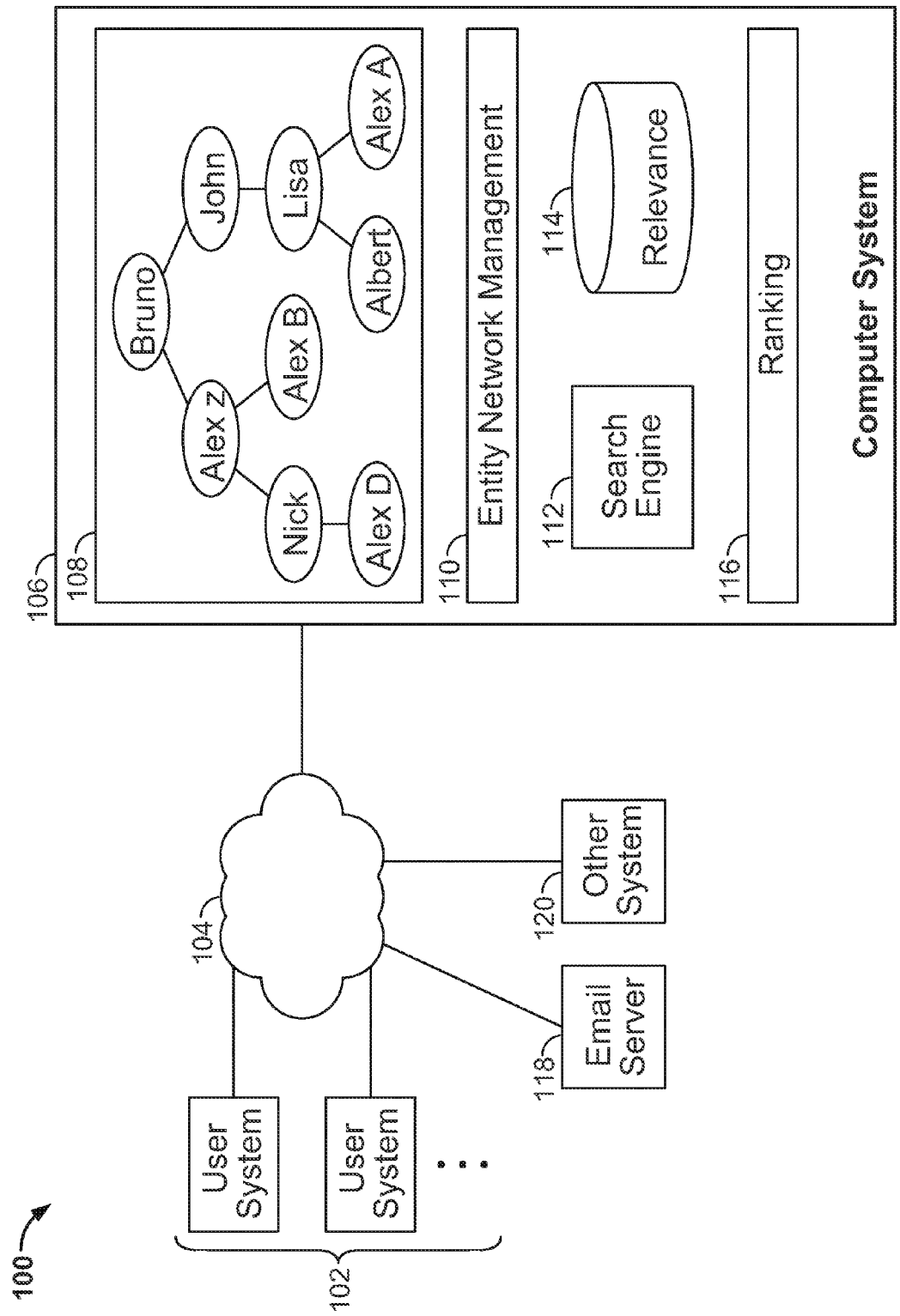
FIG. 1 shows an example of a system that can rank search results using an entity network.

FIG. 1 shows an example of a system 100 that can rank search results using an entity network. Here, the system 100 includes user systems 102 that can communicate with each other and/or with any other systems or devices through a network 104. The user systems 102 can include, but are not limited to, smartphones, mobile devices, handheld computers, laptop computers, desktop computers or workstations, to name just a few examples. In various implementations, some or all of the user systems 102 can be operated by employees of a company, or any other members of an organization. For example, each user can have at least one unique account in the system 100 and can log into the system for one or more purposes. The network 104 can include any suitable network including, without limitation, a local area network and/or the internet.

The system 100 includes a computer system 106. The computer system can include any suitable type of device including, but not limited to, a web server. In some implementations, the computer system can be operated by an organization (e.g., a company) as part of its business activities, such as to provide for communication inside and outside the organization. For example, the computer system can be operated by an employer of employees that operate the user systems 102.

The computer system 106 has stored therein at least one entity network 108 that includes entities associated with each other by relations. In some implementations, the entity network can be considered a social network. For example, the entity network can reflect a company organization in form of one or more hierarchies, such as an electronic organization chart. Here, the following example structure is shown in the entity network 108:

TABLE I

| Name | Reports to |
|------|------------|
| Albert | Lisa |
| Alex A | Lisa |
| Alex B | Alex Z |
| Alex D | Nick |
| Alex Z | Bruno |
| Bruno | — |
| John | Bruno |
| Lisa | John |
| Nick | Alex Z |

The entity network 108 can be stored in any suitable form of storage or repository. In some implementations, the computer system 106 can store the entity network entirely or mainly in memory, as opposed to on disk, etc. Using in-memory techniques can speed up the access and retrieval of data, and can therefore help provide a quick turnaround time. For example, the HANA™ platform available from SAP AG uses in-memory database technology and can be used for the entity network.

The computer system 106 includes an entity network management component 110 that can manage the entity network 108. In some implementations, the entity network management component can create, maintain and modify the entity network when needed. For example, one or more new entities (e.g., a new employee) can be added, or at least one existing entity can be removed. As another example, a new relation can be added, or an existing relation can be removed.

The computer system 106 includes a search engine 112 that can be used for searching among records or other information in the system 100. In some implementations, the search engine provides searching among entities represented by the entity network 108. For example, a user can run a search to find employees that match one or more criteria.

The computer system 106 includes a relevance repository 114 that can store relevance information. In some implementations, the relevance information can be used in searching among entities represented by the entity network 108. For example, the relevance information can influence which search results are presented to the user, and/or how the results are presented.

The computer system 106 includes a ranking component 116 that can be used for ranking the search results found by the search engine 112. The ranking component can use some or all of the relevance information in the relevance repository 114. In some implementations, when a search for entities is performed, the ranking component can rank the results according to their respective relevance with regard to the user who submitted the search. For example, the proximity in the entity network can be used as an indicator of relevance.

One or more other relevance factors can be used. In some implementations, emails or other electronic communication between two or more entities can be used as a relevance indicator. For example, the system 100 can include an email server 118 that is used for communication among the user systems 102, and the email traffic can be registered and used in searching for entities and/or presenting the search results. In some implementations, the system 100 includes at least one other system 120 from which relevance information can also or instead be obtained. For example, the other system can provide information regarding instant messaging, voice communication, telephone calls, demographic information, job-related information, skills-related information, or other relevant information, to name just some examples.

A particular example will now be described to illustrate use of the system 100. In this example, the company's organizational chart includes nine people, as indicated in the entity network 108. Particularly, if arbitrary employee identifiers one through nine are assigned to these employees, they can form the following list:

TABLE II

| ID | Name |
|----|------|
| 1 | Bruno |
| 2 | Alexey Bochevsky |
| 3 | Lisa |
| 4 | Alex Daniels |
| 5 | John |
| 6 | Alexis Amster |
| 7 | Albert |
| 8 | Nick |
| 9 | Alexander Zuev |

That is, the entity network in this example includes four people whose first name is, or whose nickname could be, Alex; that is, Alexey Bochevsky, Alex Daniels, Alexis Amster and Alexander Zuev. Here, the last names of the other employees are omitted for clarity.

Using the IDs of Table II, the "reports-to" information from Table I can now be represented as:

TABLE III

| Source | Target |
|--------|--------|
| 1 | 5 |
| 1 | 9 |
| 9 | 8 |
| 9 | 2 |
| 8 | 4 |
| 5 | 3 |
| 3 | 7 |

TABLE III-continued

| Source | Target |
|---|---|
| 3 | 6 |

Assume now that the user named Bruno logs in and runs a search (e.g., using the search engine 112) for the term "Alex". In some implementations, this can be done using a query such as:

"SELECT * FROM ENTITIES WHERE NAME LIKE 'Alex %'";

The search is executed on the entity network and identifies four employees as responsive to the query. If the ranking component 116 were to rank the four search results by increasing employee ID, then the output (which is the same as would be obtained by the default behavior of many relational databases) would be:

TABLE IV

| ID | Name |
|---|---|
| 2 | Alexey Bochevsky |
| 4 | Alex Daniels |
| 6 | Alexis Amster |
| 9 | Alexander Zuev |

However, it can be seen in the entity network 108 that the highest ranked result in Table IV—Alexey Bochevsky—is not the entity closest to Bruno in the company's organization. Moreover, Alexis Amster who is separated from Bruno by two levels of managers—John and Lisa—is listed higher than Alexander Zuev who reports directly to Bruno. That is, when Bruno searches for "Alex" it may be more likely that he is seeking someone closely associated with himself in the organization, rather that someone who he seldom interacts with and may never have met.

Instead, the ranking component 116 can take information from the relevance repository 114 into account. In some implementations, the proximity in the entity network 108 is used. For example, search hits that are separated from Bruno by fewer relations are then ranked higher, and the following output can be generated:

TABLE V

| ID | Name |
|---|---|
| 9 | Alexander Zuev |
| 2 | Alexey Bochevsky |
| 4 | Alex Daniels |
| 6 | Alexis Amster |

That is, this ranking serves to elevate "Alexander Zuev" from the bottom to the top of the list in this example, because Alexander Zuev reports directly to Bruno.

In some implementations, the following algorithm can be performed every time a new entity or relation is added to the system:

1) For every entity, calculate how many steps it will take to reach that entity from the new entity, and then divide 100 by that number of steps.

2) Insert the number of the entity and the result number into a relevance table (e.g., the relevance repository 114).

The above relevance determination can be seen as "decorating" the employee entities regarding the newly added entity (or relation). In some implementations, the entities can instead or also be decorated by one or more other aspects. For example, the entities can be decorated based on electronic communications.

As an illustration, assume that Bruno is being added to the entity network in the indicated position (i.e., at the top of the hierarchy). The following relevance results can then be generated according to the above algorithm:

TABLE VI

| SOURCE_ENTITY_ID | TARGET_ENTITY_ID | Relevance | Steps | Name |
|---|---|---|---|---|
| ... | ... | ... | ... | ... |
| 1 | 2 | 50 | 2 | Alexey Bochevsky |
| 1 | 3 | 50 | 2 | Lisa |
| 1 | 4 | 33 | 3 | Alex Daniels |
| 1 | 5 | 100 | 1 | John |
| 1 | 6 | 33 | 3 | Alexis Amster |
| 1 | 7 | 33 | 3 | Albert |
| 1 | 8 | 50 | 2 | Nick |
| 1 | 9 | 100 | 1 | Alexander Zuev |
| ... | ... | ... | ... | ... |

That is, John and Alexander Zuev, who report directly to Bruno, have the highest relevance. In some implementations, only the SOURCE_ENTITY_ID, TARGET_ENTITY_ID and Relevance columns are included in the database table. The Steps and Name columns are included here for clarity.

Assume now that a search for "Alex" is to be performed. For example, the following query can be executed:

| | |
|---|---|
| SELECT | E.ID, E.NAME, RD.RELEVANCY |
| FROM | ENTITIES E |
| JOIN | RELATIONS_DECORATOR RD ON |
| | (E.ID=RD.TARGET_ENTITY_ID) |
| WHERE | E.ID=1 |
| AND | E.NAME LIKE 'Alex%' |
| ORDER BY | RD.RELEVANCY DESC |

The output from the above query in this example is:

TABLE VII

| ID | Name |
|----|------|
| 9 | Alexander Zuev |
| 2 | Alexey Bochevsky |
| 4 | Alex Daniels |
| 6 | Alexis Amster |

The ranking in Table VII corresponds to that in Table V. Particularly, the result in Table VII can be obtained using only basic database functionality, without copying the data to external indexes.

That is, the system 100 in this example can rank search results using the entity network 108. The search engine 112 can receive an entity search query submitted for performance on the entity network, and the entity search query here includes the term "Alex" and indicates Bruno as the query submitter. Based on the received search query the search engine identifies all entities in the entity network that are responsive to the term. The ranking component 116 can rank the identified entities based on relevance with regard to Bruno. This ranking can be performed using proximity in the entity network. The computer system 106 can then present the identified entities in response to the entity search query, wherein the entities are presented in an order corresponding to the ranking.

Figure 2:
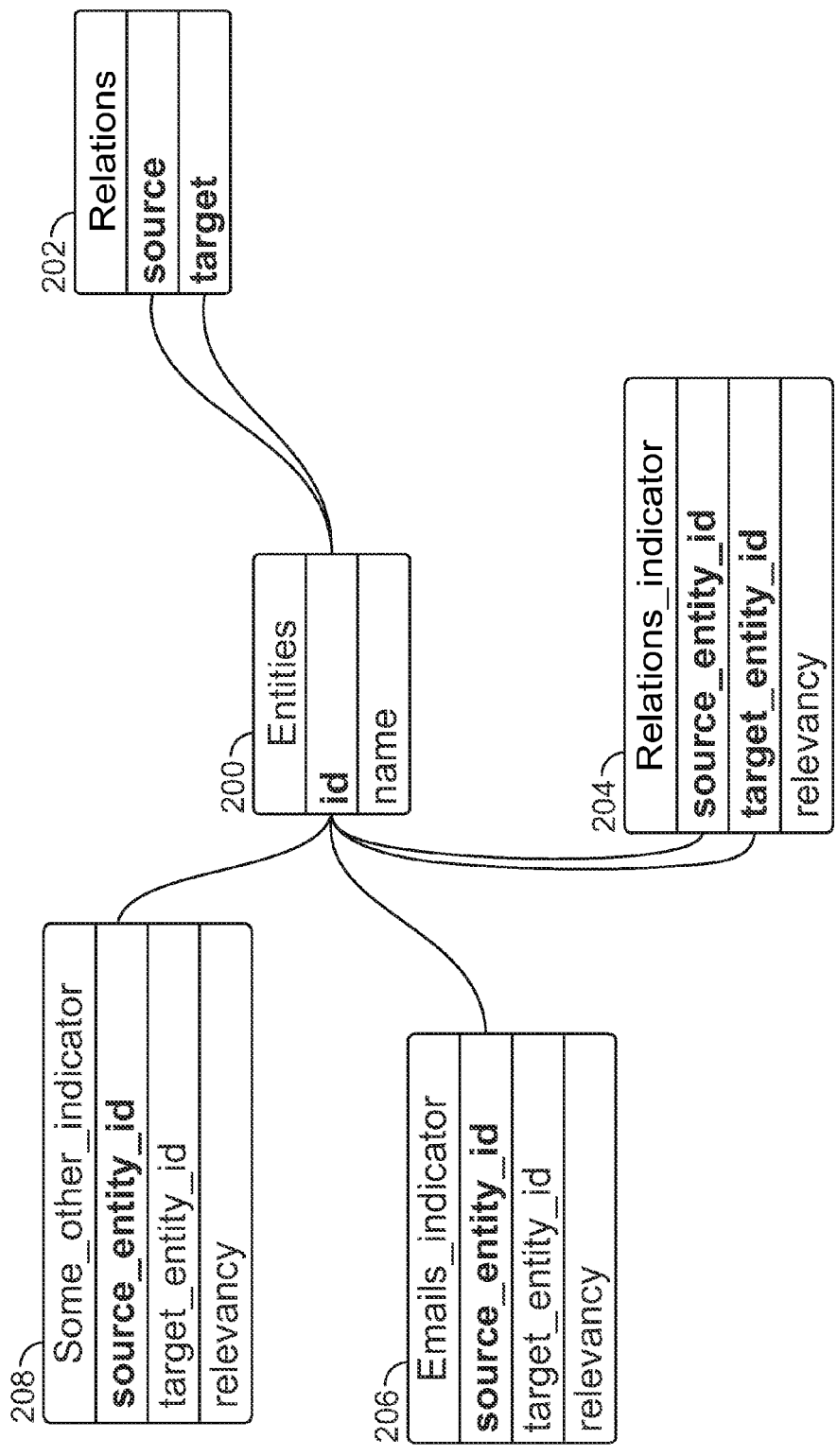
FIG. 2 shows examples of database tables that can be used for ranking search results using an entity network.

FIG. 2 shows examples of database tables that can be used for ranking search results using an entity network. In this example, an Entities table 200 associates an identifier ("id") with a name, for example as in Table II. A Relations table 202 associates a source with a target, for example as in Table III. A Relations_indicator table 204 associates a source_entity_id and a target_entity_id with a relevancy, for example as in Table VI. An Emails-indicator table 206 associates a source_entity_id and a target_entity_id with a relevancy based on email communication between the source_entity_id and the target_entity_id. A Some_other_indicator table 208 associates a source_entity_id and a target_entity_id with a relevancy based on some other relation between the source_entity_id and the target_entity_id. The "Some_other_indicator" table represents any number of tables. Generally, all indicator tables share basic columns, but can have one or more other columns as well.

For example, the following operations can be performed when a new entity is added to the entity network. The system can detect that a new entity is being added to the Entities table 200. In response to the addition, the entity network management component 110 (FIG. 1) can determine relevance scores for the new entity with regard to all current entities in the entity network. The system can store the determined relevance scores in the Relations_indicator table 204. A corresponding process can be performed when a new relation is added to the Relations table 202.

One or more indicators other than proximity can be used. In some implementations the Emails_indicator table 206 is updated based on every email that an employee sends to one or more coworkers. A search query can then also take into account the email relevance. For example, the following query can be executed:

```
SELECT    E.ID, E.NAME
FROM      ENTITIES E
JOIN      RELATIONS_DECORATOR RD ON
          (E.ID=RD.TARGET_ENTITY_ID)
JOIN      EMAILS_DECORATOR ED ON
          (E.ID=ED.TARGET_ENTITY_ID)
WHERE     E.ID=1
AND       E.NAME LIKE 'Alex%'
ORDER BY  (RD.RELEVANCY + ED.RELEVANCY)/2 DESC
```

The results of the above query are ranked according to both proximity and email relations, and can be output to the user in a suitable format.

Two or more relevance indicators can be weighted relative to each other. For example, the following query can be executed:

```
SELECT    E.ID, E.NAME
FROM      ENTITIES E
JOIN      RELATIONS_DECORATOR RD ON
          (E.ID=RD.TARGET_ENTITY_ID)
JOIN      EMAILS_DECORATOR ED ON
          (E.ID=ED.TARGET_ENTITY_ID)
WHERE     E.ID=1
AND       E.NAME LIKE 'Alex%'
ORDER BY  (RD.RELEVANCY*30)/100+(ED.RELEVANCY*70)/
          100 DESC
```

That is, the above query gives proximity in the entity network (e.g., graph distance) a weight of 30%, and emails a weight of 70%. Other weights can be used. If queries are written dynamically or if pregenerated views are used, the end user (or administrator) could also choose, for every single search, the relevancy calculation to use.

Figure 3:
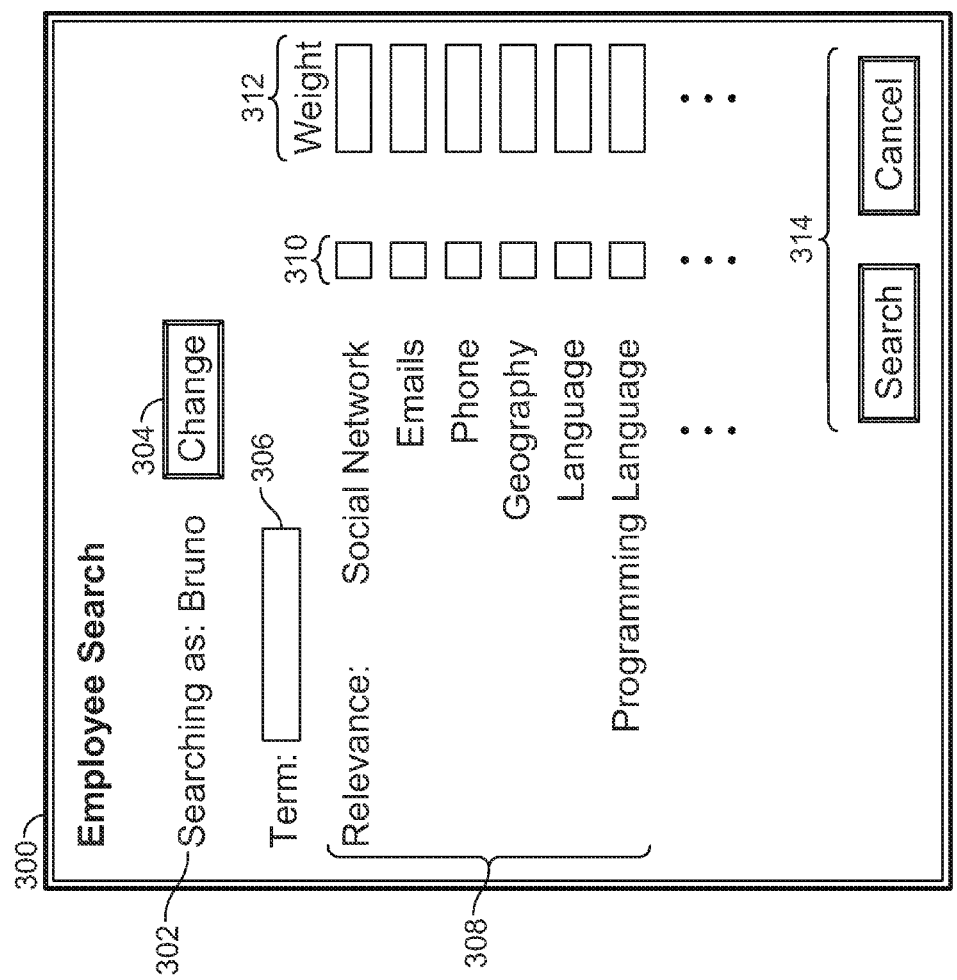
FIG. 3 shows an example search view that can be used to search for results in an entity network.

FIG. 3 shows an example search view 300 that can be used to search for results in an entity network. In some implementations, the search view is used to search for entities in a hierarchical organization chart of a company. For example, any of the employees in the entity network 108 (FIG. 1) can search for coworkers.

The search view includes a searching-as field 302 that currently indicates "Bruno". That is, the search is being entered by Bruno (e.g., as detected by login information) or the search is being entered on Bruno's behalf. A change function 304 can be used to set a different user as the query submitter. The user enters one or more terms in a field 306.

A relevance area 306 lets the user specify one or more relevance indicators to be used in the search and/or in ranking the results. For example, the user can check a box 310 for any relevance that should be taken into account. In some implementations, the user can submit weights for one or more relevance indicators. For example, percentage numbers can be entered.

The search can be initiated, or canceled, using controls 314. Results can be presented in the search view 300 or in another view.

Figure 4:
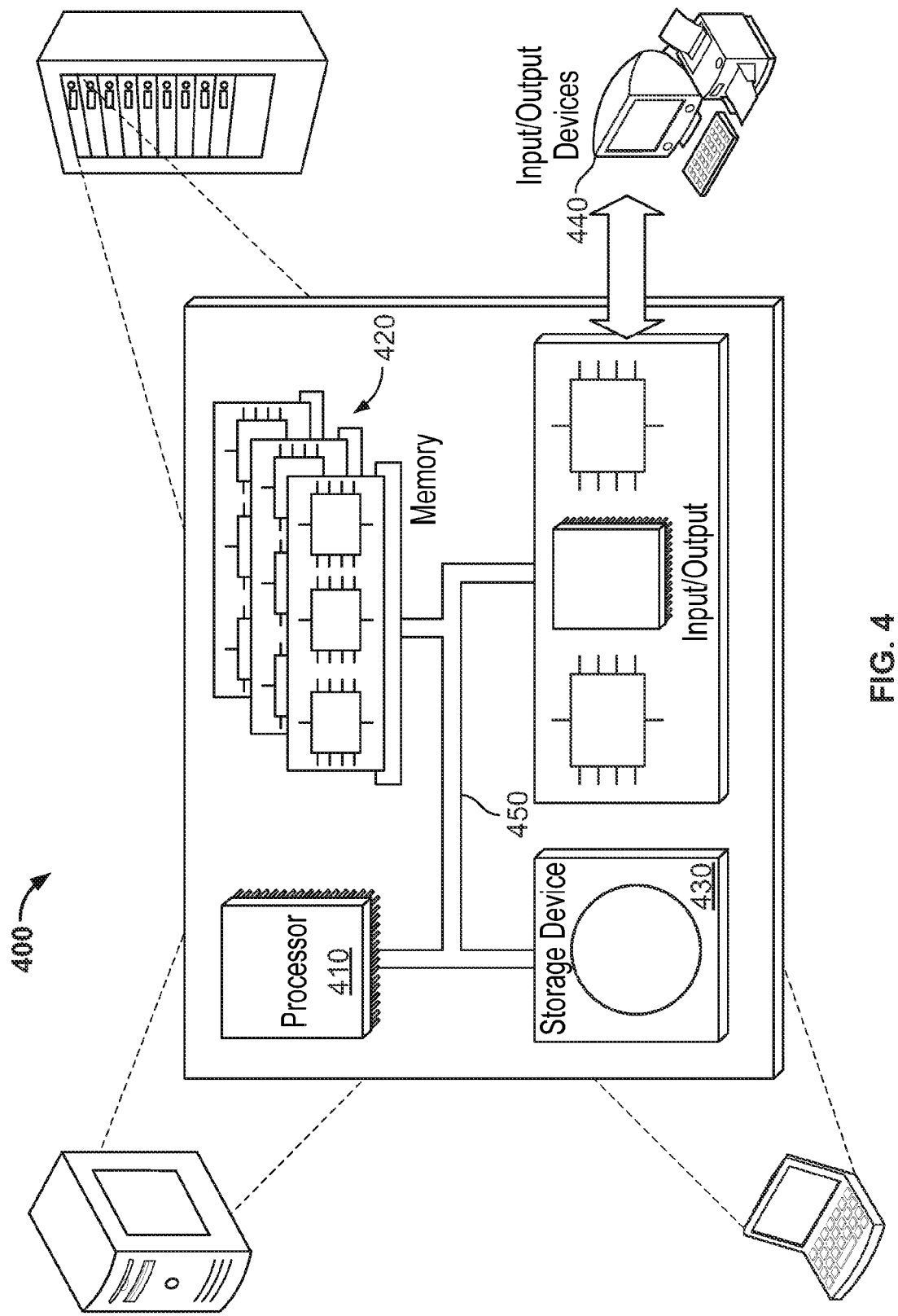
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for ranking search results using an entity network, the method comprising:
   receiving, by a computing system that uses one or more processors, an entity search query submitted for performance on an entity network, the entity search query:
   (i) including at least one term, and
   (ii) indicating a query submitter entity, wherein the entity network comprises entities associated with each other by relations;
   identifying, by the computing system and based on the received search query, all entities in the entity network that are responsive to the at least one term, wherein the identified entities represent multiple respective employees that match the received entity search query;
   ranking the identified entities, by the computing system, based on a first relevance score that was generated by the computing system for each of the identified entities before receipt of the search query and based on a second relevance score that was generated for each of the identified entities before receipt of the search query, wherein:
   (i) the first relevance score for each of the identified entities was generated based on proximity in the entity network of the respective identified entity to the query submitter entity, and
   (ii) the second relevance score for each of the identified entities was generated based on an amount of electronic communications between the respective identified entity and the query submitter entity; and
   presenting, by the computing system and in response to receiving the search query, the identified entities in an order that corresponds to the ranking, such that the identified entities are ordered based on both proximity of the identified entities to the query submitter entity and amount of electronic communications by the identified entities with the query submitter entity.

2. The computer-implemented method of claim 1, further comprising weighting, for each of the identified entities, the first relevance score and the second relevance score before the ranking, wherein the ranking takes into account the weighting.

3. The computer-implemented method of claim 1, wherein:

the entity network is stored entirely in memory, as opposed to on disk, in order to speed identification of all the entities in the entity network that are responsive to the at least one term; and identifying all entities in the entity network that are responsive to the at least one term includes using only database functionality without copying data to external indexes.

4. The computer-implemented method of claim 1, further comprising providing, by the computing system, a user interface that includes:
  (i) a first check box that enables user input to specify whether the first relevance score for each of the identified entities to the query submitter entity is to be used in the ranking, and
  (ii) a second check box that enables user input to specify whether the second relevance score for each of the identified entities to the query submitter entity is to be used in the ranking.

5. The computer-implemented method of claim 1, further comprising providing, by the computing system, a user interface that includes:
  (i) a first user interface element that enables user input to specify whether the first relevance score for each of the identified entities to the query submitter entity is to be used in the ranking,
  (ii) a second user interface element that enables user input to specify whether the second relevance score for each of the identified entities to the query submitter entity is to be used in the ranking,
  (iii) a third user interface element that enables user input to specify a first weight that is applied in the ranking to the first relevance score for each of the identified entities to the query submitter entity, and
  (iv) a fourth user interface element that enables user input to specify a second weight that is applied in the ranking to the second relevance score for each of the identified entities to the query submitter entity.

6. The computer-implemented method of claim 1, further comprising:
  detecting, by the computing system, addition of a new entity to the entity network;
  in response to the addition, determining first relevance scores for the new entity with regard to all current entities in the entity network by determining a new first relevance score for each of the current entities in the entity network with respect to the new entity, based on a proximity in the entity network of each of the current entities to the new entity;
  in response to the addition, determining second relevance scores for the new entity with regard to all current entities in the entity network by determining a new second relevance score for each of the current entities in the entity network with respect to the new entity, based on an amount of electronic communications of each of the current entities to the new entity; and
  storing the determined relevance scores.

7. The computer-implemented method of claim 6, wherein determining the first relevance score comprises:
  determining, using the relations in the entity network and for each of the current entities in the entity network, a number of steps between the new entity and the current entity;
  for each of the current entities, dividing a constant number by the determined number of steps between the new entity and the current entity; and for each of the current entities, assigning a quotient of the division as the first relevance score for the new entity with regard to the current entity.

8. A non-transitory computer-readable storage medium comprising instructions that, when executed by a processor, cause the processor to perform a method for ranking search results using an entity network, the method comprising:
  receiving, by a computing system that uses one or more processors, an entity search query submitted for performance on an entity network, the entity search query:
    (i) including at least one term, and
    (ii) indicating a query submitter entity, wherein the entity network comprises entities associated with each other by relations;
  identifying, by the computing system and based on the received search query, all entities in the entity network that are responsive to the at least one term, wherein the identified entities represent multiple respective employees that match the received entity search query;
  ranking the identified entities, by the computing system, based on a first relevance score that was generated by the computing system for each of the identified entities before receipt of the search query and based on a second relevance score that was generated for each of the identified entities before receipt of the search query, wherein:
    (i) the first relevance score for each of the identified entities was generated based on proximity in the entity network of the respective identified entity to the query submitter entity, and
    (ii) the second relevance score for each of the identified entities was generated based on an amount of electronic communications between the respective identified entity and the query submitter entity; and
  presenting, by the computing system and in response to receiving the search query, the identified entities in an order that corresponds to the ranking, such that the identified entities are ordered based on both proximity of the identified entities to the query submitter entity and amount of electronic communications by the identified entities with the query submitter entity.

9. The non-transitory computer-readable storage medium of claim 8, the method further comprising weighting, for each of the identified entities, the first relevance score and the second relevance score before the ranking, wherein the ranking takes into account the weighting.

10. The non-transitory computer-readable storage medium of claim 8, the method further comprising:
  detecting, by the computing system, addition of a new entity to the entity network; in response to the addition, determining first relevance scores for the new entity with regard to all current entities in the entity network by determining a new first relevance score for each of the current entities in the entity network with respect to the new entity, based on a proximity in the entity network of each of the current entities to the new entity;
  in response to the addition, determining second relevance scores for the new entity with regard to all current entities in the entity network by determining a new second relevance score for each of the current entities in the entity network with respect to the new entity, based on an amount of electronic communications of each of the current entities to the new entity; and
  storing the determined relevance scores.

11. The non-transitory computer-readable storage medium of claim 10, wherein determining the first relevance score comprises:

determining, using the relations in the entity network and for each of the current entities in the entity network, a number of steps between the new entity and the current entity;

for each of the current entities, dividing a constant number by the determined number of steps between the new entity and the current entity; and for each of the current entities, assigning a quotient of the division as the first relevance score for the new entity with regard to the current entity.

12. A system comprising:

one or more processors; and a computer-readable storage medium comprising instructions that, when executed by the one or more processor, cause the one or more processors to perform a method for ranking search results using an entity network, the method comprising:

receiving, by a computing system that uses one or more processors, an entity search query submitted for performance on an entity network, the entity search query:
(i) including at least one term, and
(ii) indicating a query submitter entity, wherein the entity network comprises entities associated with each other by relations;

identifying, by the computing system and based on the received search query, all entities in the entity network that are responsive to the at least one term, wherein the identified entities represent multiple respective employees that match the received entity search query;

ranking the identified entities, by the computing system, based on a first relevance score that was generated by the computing system for each of the identified entities before receipt of the search query and based on a second relevance score that was generated for each of the identified entities before receipt of the search query, wherein:
(i) the first relevance score for each of the identified entities was generated based on proximity in the entity network of the respective identified entity to the query submitter entity, and
(ii) the second relevance score for each of the identified entities was generated based on an amount of electronic communications between the respective identified entity and the query submitter entity; and presenting, by the computing system and in response to receiving the search query, the identified entities in an order that corresponds to the ranking, such that the identified entities are ordered based on both proximity of the identified entities to the query submitter entity and amount of electronic communications by the identified entities with the query submitter entity.

13. The system of claim 12, the method further comprising weighting, for each of the identified entities, the first relevance score and the second relevance score before the ranking, wherein the ranking takes into account the weighting.

14. The system of claim 12, the method further comprising:

detecting, by the computing system, addition of a new entity to the entity network;

in response to the addition, determining first relevance scores for the new entity with regard to all current entities in the entity network by determining a new first relevance score for each of the current entities in the entity network with respect to the new entity, based on a proximity in the entity network of each of the current entities to the new entity;

in response to the addition, determining second relevance scores for the new entity with regard to all current entities in the entity network by determining a new second relevance score for each of the current entities in the entity network with respect to the new entity, based on an amount of electronic communications of each of the current entities to the new entity; and storing the determined relevance scores.

15. The system of claim 14, wherein determining the first relevance score comprises:

determining, using the relations in the entity network and for each of the current entities in the entity network, a number of steps between the new entity and the current entity;

for each of the current entities, dividing a constant number by the determined number of steps between the new entity and the current entity; and for each of the current entities, assigning a quotient of the division as the first relevance score for the new entity with regard to the current entity.

* * * * *